US009727169B2

United States Patent
Fu

(10) Patent No.: US 9,727,169 B2
(45) Date of Patent: *Aug. 8, 2017

(54) EMBEDDED DISPLAY SCREEN HAVING TOUCH DETECTION FUNCTION, TERMINAL DEVICE, AND TOUCH DETECTION METHOD

(71) Applicant: Shenzhen China Star Optoelectronics Technology Co., Ltd., Shenzhen, Guangdong (CN)

(72) Inventor: Ruhai Fu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 269 days.

This patent is subject to a terminal disclaimer.

(21) Appl. No.: 14/433,603

(22) PCT Filed: Dec. 17, 2014

(86) PCT No.: PCT/CN2014/094060
§ 371 (c)(1),
(2) Date: Apr. 3, 2015

(87) PCT Pub. No.: WO2016/090655
PCT Pub. Date: Jun. 16, 2016

(65) Prior Publication Data
US 2016/0349916 A1    Dec. 1, 2016

(30) Foreign Application Priority Data

Dec. 9, 2014   (CN) .......................... 2014 1 0749411

(51) Int. Cl.
G06F 3/041        (2006.01)
G06F 3/044        (2006.01)
G02F 1/1333       (2006.01)

(52) U.S. Cl.
CPC ........ G06F 3/0418 (2013.01); G02F 1/13338 (2013.01); G06F 3/041 (2013.01); G06F 3/044 (2013.01); G06F 3/0412 (2013.01)

(58) Field of Classification Search
CPC ......... G06F 3/0416; G06F 3/044; G06F 3/041
(Continued)

(56) References Cited

U.S. PATENT DOCUMENTS 9,218,085 B2    12/2015  Hwang
2013/0215075 A1*  8/2013  Lee .......................... G06F 3/044
                                                          345/174
(Continued)

FOREIGN PATENT DOCUMENTS

CN          CN104484083 A        4/2015

Primary Examiner — Koosha Sharifi-Tafreshi
(74) Attorney, Agent, or Firm — Andrew C. Cheng

(57)  ABSTRACT

An embedded display screen and a terminal device having touch detection function, and a touch detection method are disclosed. The touch screen includes an upper substrate, a lower substrate, a liquid crystal display layer, and a common electrode. The common electrode is divided into multiple sub-electrodes arranged as a matrix to form a touch detection electrode. The driving selector is correspondingly connected with the multiple sub-electrodes one by one through multiple lead wires. The touch controller is disposed outside the upper substrate and the lower substrate, and is connected with the driving selector through selection signal line and scanning signal line. A total number of the selection signal line and the scanning signal line is less than a total number of the lead wires. The touch controller sends a selection signal to the driving selector through the selection signal line. Accordingly, the number of the lead wires is reduced.

12 Claims, 5 Drawing Sheets

(58) Field of Classification Search
USPC .......................................... 345/173, 174, 87
See application file for complete search history.

(56) References Cited

U.S. PATENT DOCUMENTS

| | | |
|---|---|---|
| 2014/0043274 A1 | 2/2014 | Yao |
| 2014/0240279 A1 | 8/2014 | Hwang |
| 2014/0362031 A1* | 12/2014 | Mo .......................... G09G 3/36 345/174 |
| 2015/0049050 A1 | 2/2015 | Zhao |
| 2015/0097802 A1* | 4/2015 | Kim ........................ G06F 3/044 345/174 |
| 2015/0116263 A1* | 4/2015 | Kim ........................ G06F 3/044 345/174 |
| 2016/0098126 A1 | 4/2016 | Lee |

* cited by examiner

EMBEDDED DISPLAY SCREEN HAVING TOUCH DETECTION FUNCTION, TERMINAL DEVICE, AND TOUCH DETECTION METHOD

BACKGROUND OF THE INVENTION

1. Field of the Invention

The present invention relates to an embedded display screen, and more particularly to an embedded display screen having touch detection function, a terminal device, and a touch detection method.

2. Description of Related Art

Currently, in the market, a touch display screen can be divided into two types: a separated touch display screen and an embedded touch display screen. Wherein, the embedded touch display screen embeds a touch sensor into a liquid crystal panel in order to be thin and lightweight.

In the current embedded self-capacitive touch display screen, multiple touch electrodes are disposed between an upper glass substrate and a lower glass substrate of the display screen. The touch electrodes form an electrode array and are full of the entire surface of the glass substrate. Wherein, each of the touch electrodes can be made of any conductive layer or any conductive material. The self-capacitive touch display screen only require single electrode layer. Through detecting a capacitance formed between a touch electrode and a touch object to determine a touch event, and through detecting capacitances of adjacent touch electrodes to perform a weighting calculation to obtain a touch location. Specifically, all touch electrodes of the touch display screen are led out and form multiple bonding pins through a bonding package method. Each touch electrode corresponds to one bonding pin so as to connect to an outer driving chip. The driving chip independently scans all of the touch electrodes inside the display screen to determine the touch event.

However, when the detection precision of a touch display screen is required to be higher, more touch electrodes are required to be disposed. In conventional art, each touch electrode is corresponds to one bonding pin. As a result, the number of the bonding pins is too many. Therefore, when adopting the conventional art to produce a touch display screen, the production precision is required to be higher, the production efficiency will be affected such that the touch display screen is not suitable for mass production.

SUMMARY OF THE INVENTION

The technology problem solved by the present invention is to provide an embedded display screen and a terminal device having touch detection function, and a touch detection method. A driving selector selects electrode to be connected to a touch controller one by one to perform a touch scanning. Accordingly, the number of the lead wires required to be connected with the touch controller is greatly reduced.

In order to solve the above technology problems, a technology solution adopted by the present invention is: an embedded display screen having touch detection function, comprising: an upper substrate; a lower substrate; a liquid crystal display layer disposed between the an upper substrate and the lower substrate; a common electrode disposed between the upper substrate and the liquid crystal display layer, wherein, the common electrode is divided into multiple sub-electrodes arranged as a matrix to form a touch detection electrode; a driving selector disposed between the upper substrate and the lower substrate, and correspondingly connected with the multiple sub-electrodes one by one through multiple lead wires; and a touch controller disposed outside a space formed by the upper substrate and the lower substrate, wherein, the touch controller is connected with the driving selector through at least one selection signal line and at least one scanning signal line; a total number of the at least one selection signal line and the at least one scanning signal line is less than a total number of the lead wires; the touch controller sends a selection signal to the driving selector through the at least one selection signal line; the driving selector responses to the selection signal and selects at least one lead wire from the multiple lead wires to be connected with the at least one scanning signal line.

Wherein, the driving selector comprises multiple switching modules; each of the multiple switching modules comprises a first terminal, a second terminal, and a control terminal; the first terminals of the switching modules are connected with each other, and are connected with the touch controller through the at least one scanning signal lines; each second terminal of the switching module is connected with one corresponding sub-electrode through one corresponding lead wire; each control terminal is connected with the touch controller through the selection signal line.

Wherein, the display screen comprises multiple selection signal lines, and each selection signal line is connected with multiple control terminals of the switching modules; the number of the switching modules connected with each selection signal line is the same or different.

Wherein, the display screen comprises multiple scanning signal lines, and each scanning signal line is connected with multiple first terminals of the switching modules; the number of the switching modules connected with each scanning signal line is the same or different.

Wherein, the display screen further comprises a display controller; the touch controller sends the selection signal in a time interval when the display controller does not perform a display driving to the liquid crystal display layer.

Wherein, the display screen further comprises at least two bonding packaged pins; the at least one selection signal line and the at least one scanning signal are correspondingly connected with the at least two bonding packaged pins such that the touch controller and the driving selector are connected.

Wherein, the display screen is a self-capacitive type.

In order to solve the above technology problems, another technology solution adopted by the present invention is a terminal device, which includes the embedded display screen having touch detection function described at any one of the above embodiments.

In order to solve the above technology problems, another technology solution adopted by the present invention is a touch detection method, comprising: receiving a selection signal; and selecting at least one touch electrode to be connected with a touch controller outside a display screen in multiple touch electrodes of the display screen for realizing a touch detection function; wherein, the multiple touch electrodes are formed by dividing a common electrode of the display screen.

Wherein, in the step of receiving a selection signal: receiving the selection signal in a time interval when the display screen does not perform a display driving.

The present invention provides an embedded display screen and a terminal device having touch detection function, and a touch detection method is disclosed. The touch screen includes an upper substrate, a lower substrate, a liquid crystal display layer, and a common electrode. The common electrode is divided into multiple sub-electrodes arranged as a matrix to form a touch detection electrode. The driving selector is correspondingly connected with the multiple sub-electrodes one by one through multiple lead wires. The touch controller is disposed outside the upper substrate and the lower substrate, and is connected with the driving selector through selection signal line and scanning signal line. A total number of the selection signal line and the scanning signal line is less than a total number of the lead wires. The touch controller sends a selection signal to the driving selector through the selection signal line. Accordingly, the number of the lead wires is reduced.

DETAILED DESCRIPTION OF THE PREFERRED EMBODIMENT

The following will combine drawings and embodiments for detailed description of the present invention.

Figure 1:
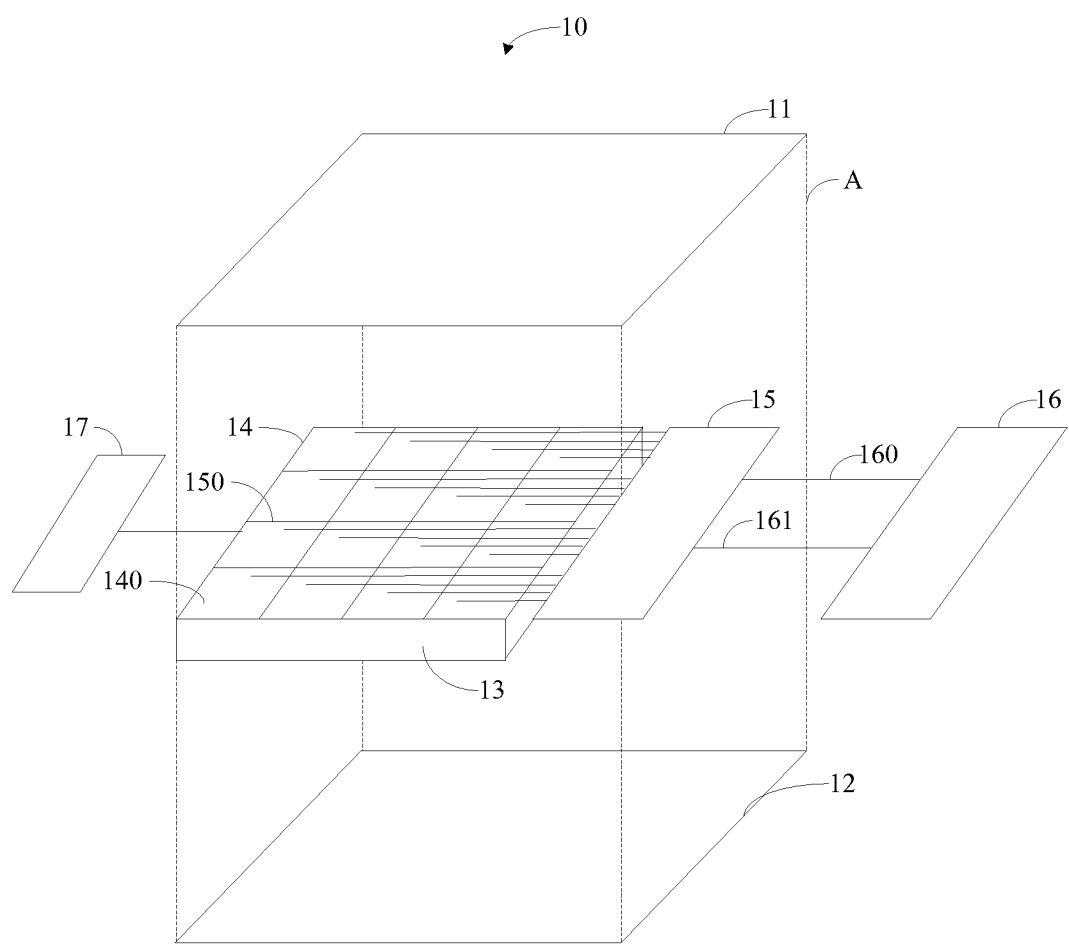
FIG. 1 is a schematic diagram of an embedded display screen having touch detection function according to a first embodiment of the present invention.

With reference to FIG. 1, which is a schematic diagram of an embedded display screen having touch detection function according to a first embodiment of the present invention. The display screen 10 comprises: an upper substrate 11, a lower substrate 12, and a liquid crystal display layer 13. Wherein, the liquid crystal display layer 13 is disposed between the upper substrate 11 and the lower substrate 12. A common electrode layer 14 is disposed between the upper substrate 11 and the liquid crystal display layer 13. The common electrode layer 14 is divided into multiple sub-electrodes 140 arranged as a matrix in order to form a touch electrode.

Furthermore, the display screen 10 further includes a driving selector 15 and a touch controller 16. Wherein, the driving selector 15 is disposed between the upper substrate 11 and the lower substrate 12. Each of sub-electrodes 140 is connected with the driving selector 15 through one lead wire 150. In the present embodiment, the position of the driving selector 15 is not overlapped with the upper substrate 11, lower substrate 12, the liquid crystal display layer 13, and the common electrode layer 14.

The touch controller 16 is disposed outside a space A formed by the upper substrate 11 and the lower substrate 12. The touch controller 16 is connected with the driving selector 15 through a selection signal line 160 and a scanning signal line 161. Wherein, a total number of the selection signal line 160 and the scanning signal line 161 is less than a total number of the lead wires 150.

The touch controller 16 sends a selection signal to the driving selector 15 through the selection signal line 160. The driving selector 15 responses to the selection signal to select at least one lead wire of the multiple lead wires 150 to be connected and conductive with the scanning signal line 161.

FIG. 1 only shows devices related to the display screen of the present invention. In the present invention, the display screen is an in-cell display screen. The other devices not shown in FIG. 1 are the same as the conventional art.

Furthermore, the display screen 10 further includes a display controller 17. In the present embodiment, the display controller 17 is disposed outside the space A formed by the upper substrate 11 and the lower substrate 12. The display controller 17 is connected with the common electrode 14 through lead lines. When displaying an image, the display controller 17 sends a driving signal and scanning signal to drive the liquid crystal display layer 13 to display the image. The operation principle is the same as the conventional art. The touch controller 16 sends the selection signal in a time interval when the display controller 17 does not drive the liquid crystal display layer 13 to perform the display driving.

Figure 2:
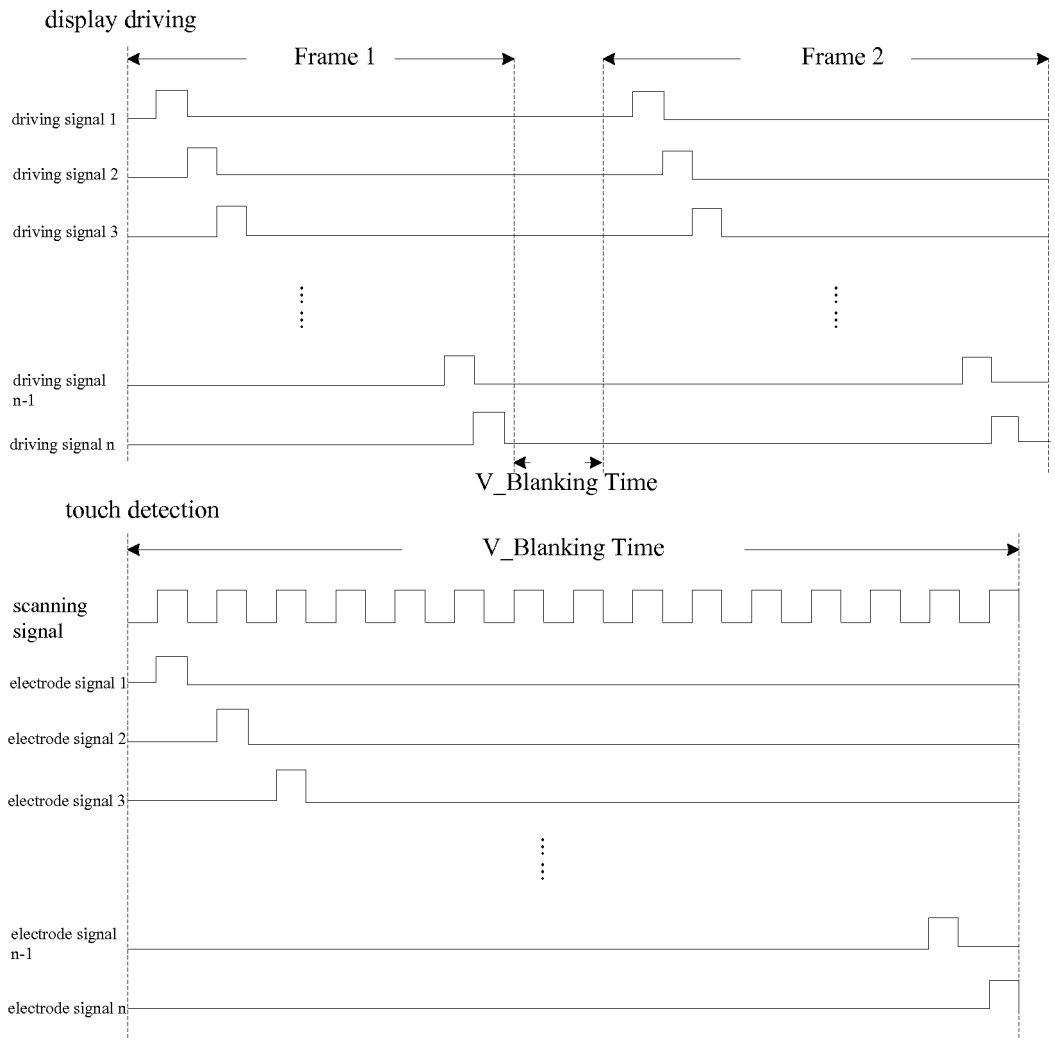
FIG. 2 is a signal timing chart when the embedded display screen having touch detection function performs display driving and touch detection.

With also reference to FIG. 2, the operation principle of the display screen 10 of the present invention is described specifically as following:

When the display screen 10 displays an image, the display controller 17 sends a driving signal as shown in FIG. 2 to display the image (for example: Frame 1 or Frame 2). When the display controller 17 scans and drives the liquid crystal layer 13 to continuously display two images (Frame 1 and Frame 2), in a time interval (i.e. V_Blanking Time) between a driving signal for displaying a previous image (Frame 1) and a driving signal for displaying a next image (Frame 2), the touch controller 16 sends the selection signal. That is, the touch controller 16 performs a touch detection in a time interval after the display controller 17 drive the liquid crystal display layer 13 to finish displaying an image and before displaying a next image. In the time interval, the display controller 17 does not send the driving signal to the liquid crystal display layer 13.

When performing touch detection, the touch controller 16 sends a scanning signal and a selection signal as shown in FIG. 2. The driving selector 15 receives the selection signal through the selection signal line 160, and the driving selector 15 responds to the selection signal to select one lead wire from the lead wires 150 connected with multiple sub-electrodes 140 to be connected and conductive with the scanning signal line 161. As a result, the scanning signal sent by the touch controller 16 can be transmitted to the sub-electrode connected with the selected lead wire through the scanning signal line 161, and performing an electrode scanning. The touch controller 16 also receives an electrode signal generated after the sub-electrode 140 be performed the electrode scanning through the scanning signal line and the selected lead wire. Accordingly, the touch controller 16 sends the selection signal and the driving selector 15 selects the multiple lead wires one by one such that the multiple sub-electrodes receives the scanning signal sent from the touch controller 16 one by one to perform the electrode scan. Besides, the corresponding electrode signals are fed back to the touch controller 16. The touch controller 16 determines the sub-electrode of the touch electrodes which generates a signal change according to the multiple received electrode signals in order to determine a coordinate of a touched location.

Wherein, a method for the touch controller 16 sending a scanning signal to the sub-electrodes 140 to perform the electrode scan is self-capacitive scanning.

Figure 3:
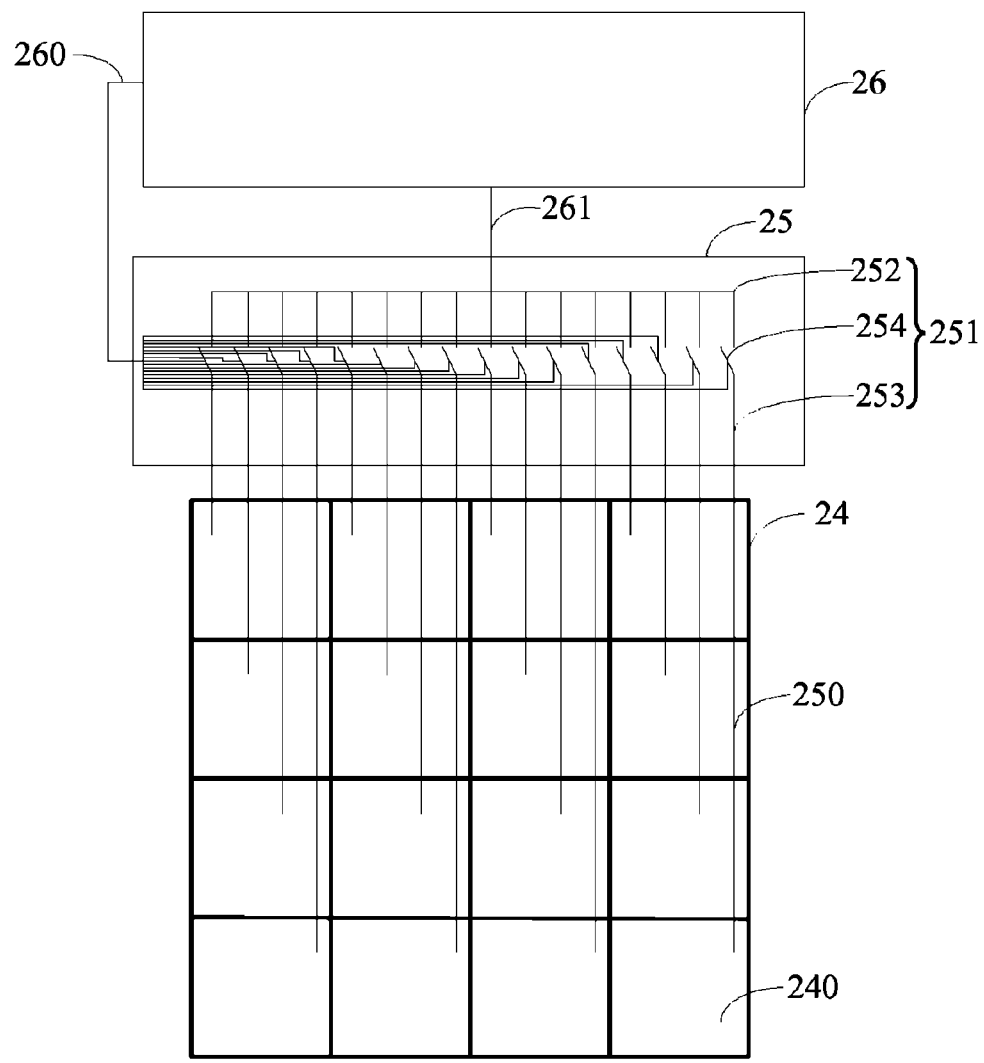
FIG. 3 is a schematic diagram of an embedded display screen having touch detection function according to a second embodiment of the present invention.

With reference to FIG. 3, which is a schematic diagram of an embedded display screen having touch detection function according to a second embodiment of the present invention.

The driving selector 25 comprises multiple switching modules 251, and each of the switching modules 251 includes a first terminal 252, a second terminal 253 and a control terminal 254. Wherein the first terminals 252 of the switching modules are connected with each other, and are connected with a touch controller 26 through a scanning signal line 261. The second terminal 254 of each switching module 251 is connected with one sub-electrode 240 through one lead wire 250. The control terminal 254 of each switching module 251 is connected with the touch controller 26 through the selection signal line 260.

In another embodiment, the display screen 10 includes a common electrode 24 and multiple selection signal lines 260. Each of the selection signal lines 260 connects with control terminals 254 of multiple switching modules 251. The number of the switching modules 251 which is connected with each selection signal line 260 is the same or different. Specifically, the selection signal lines 260 are multiple. Each of the selection signal lines 260 is connected with multiple sub-electrodes 240 through the lead wires 250. Wherein, the number of the sub-electrodes 240 connected with each of the selection signal lines 260 may be the same or be different. Similarly, the display screen 10 further includes multiple scanning signal lines 261. Each of the scanning signal lines 261 is connected with the multiple first terminals 252 of the multiple switching modules 251. The number of the switching modules 251 connected with each of the scanning signal lines 261 is the same or different. Specifically, the scanning signal lines 261 can be multiple. The multiple first terminals 252 of the switching modules 251 are connected with each other and are connected with one scanning signal line 261. The number of the first terminals 251 which are connected with each other can be determined according to an actual requirement. Accordingly, a total number of the selection signal lines 260 and the scanning signal lines 261 is obviously less than a total number of the lead wires 250 connected with the sub-electrodes 240.

The other elements in FIG. 3 can refer to FIG. 1 and the corresponding description.

Figure 4:
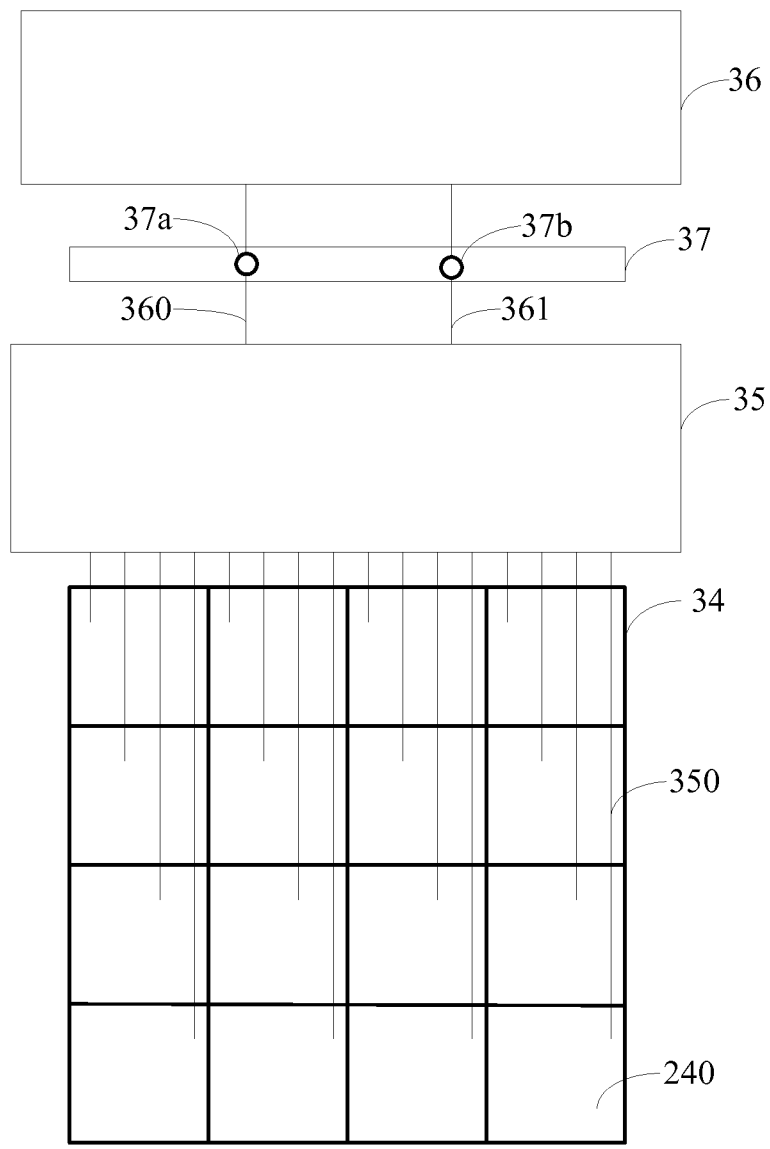
FIG. 4 is a schematic diagram of an embedded display screen having touch detection function according to a third embodiment of the present invention.

With reference to FIG. 4, which is a schematic diagram of an embedded display screen having touch detection function according to a third embodiment of the present invention. The display screen includes a common electrode 34 and at least two bonding packaged pins 37a, 37b. The selection signal line 360 and the scanning signal line 361 are respectively connected with the at least two bonding packaged pins 37a, 37b such that the touch controller 36 and the driving selector 35 are connected. Specifically, the at least two bonding packaged pins 37a, 37b form a bonding area 37. The bonding area 37 is disposed between the touch controller 36 and the selection controller 35. In the present embodiment, the bonding area 37 is disposed inside the space formed by the upper substrate 31 and the lower substrate 32, and the bonding area 37 is not overlapped with the other elements inside the space. The selection signal line 360 and the scanning signal line 361 are led out from the touch controller 36 and are respectively connected with the pins 37a, 37b. The selection signal line 360 and the scanning signal line 361 which are led out from the pins 37a, 37b are connected with the driving selector 35. Accordingly, the driving selector 35 and the touch controller 36 are connected.

Furthermore, the bonding area 37 can provide with multiple pins, but a total number of the pins is obviously less than the number of the lead wires 350. The display screen can provide with multiple selection signal lines 360 and multiple scanning signal lines 361 according to the number of the multiple pins, and the connection method is the same as described above.

The other elements in FIG. 4 can refer to FIG. 1 and the corresponding description.

In another embodiment, the other elements in FIG. 4 can refer to FIG. 3 and the corresponding description.

The present application also provides a terminal device; the terminal device comprises the display screen described in the above embodiments. The detail description can refer to the above embodiments.

Figure 5:
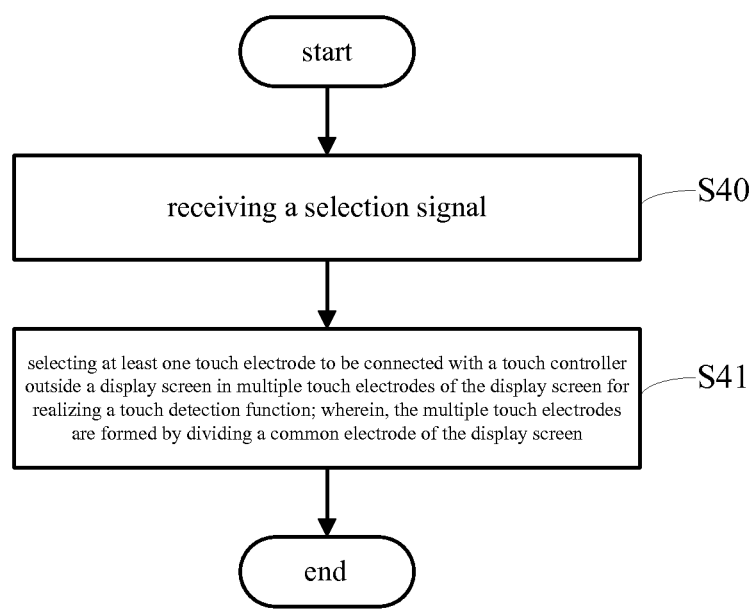
FIG. 5 is flow chart of a touch detection method according to an embodiment of the present invention.

With reference to FIG. 5, which is a flow chart of a touch detection method according to an embodiment of the present invention. The touch detection method includes the following steps:

Step S40, receiving a selection signal.

Specifically, receiving the selection signal in a time interval which a display screen does not perform a display driving.

Step S41, in multiple touch electrodes of the display screen, selecting at least one touch electrode to be connected with a touch controller outside the display screen in order to realize a touch function. Wherein, the multiple touch electrodes are formed by dividing a common electrode of the display screen.

With reference to FIG. 2 again, when the display screen is displaying an image, a driving signal is sent to perform a display of an image (for example, Frame 1 or Frame 2). In a time interval after a display of an image has been finished and before displaying a next image, a touch detection is performed. In the time interval, the driving signal is not sent to perform a display driving.

When performing touch detection, a scanning signal and a selection signal as shown in FIG. 2 are generated. According to the selection signal, select one lead wire from the lead wires connected with multiple sub-electrodes to be connected and conductive with a touch controller outside the display screen such that the scanning signal sent by the touch controller can be transmitted to the sub-electrode connected with the selected lead wire to perform an electrode scanning.

The touch controller also receives an electrode signal generated after the sub-electrode be performed the electrode scanning through the scanning signal line and the selected lead wire. Accordingly, the touch controller sends the selection signal to select the multiple lead wires one by one such that the multiple sub-electrodes receives the scanning signal sent from the touch controller one by one to perform the electrode scanning. Besides, the corresponding electrode signals are fed back to the touch controller. The touch controller determines the sub-electrode of the touch electrodes which generates a signal change according to the multiple received electrode signals in order to determine a coordinate of a touched location.

In the present embodiment, the display screen is a self-capacitive and embedded touch screen.

The present invention provides an embedded display screen having touch detection function, a terminal device, and a touch detection method. A common electrode of a display screen is divided into multiple sub-electrodes arranged as a matrix to form a touch electrode. A driving selector is disposed inside the display screen to correspondingly connect with the multiple sub-electrodes one by one through multiple lead wires. A touch controller is connected with the driving selector through at least one selection signal line and at least one scanning signal line; the touch controller send a selection signal to the driving selector through the at least one selection signal line; the driving selector responses to the selection signal and selects at least one lead wire from the multiple lead wires to be connected with the at least one scanning signal line. A total number of the at least one selection signal line and the at least one scanning signal line is less than a total number of the lead wires such that the total number of the lead wires required to be connected with the touch controller is greatly reduced.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An embedded display screen having touch detection function, comprising:
   an upper substrate;
   a lower substrate;
   a liquid crystal display layer disposed between the an upper substrate and the lower substrate;
   a common electrode disposed between the upper substrate and the liquid crystal display layer, wherein, the common electrode is divided into multiple sub-electrodes arranged as a matrix to form a touch detection electrode;
   a display controller disposed outside a space formed by the upper substrate and the lower substrate, disposed at a first side of the space, and the display controller is connected with the common electrode through lead lines;
   a driving selector disposed between the upper substrate and the lower substrate, disposed oppositely to the display controller, and correspondingly connected with the multiple sub-electrodes one by one through multiple lead wires;
   a touch controller disposed outside the space formed by the upper substrate and the lower substrate, disposed at a second side of the space and disposed oppositely to the display controller, wherein, the touch controller is connected with the driving selector through at least one selection signal line and at least one scanning signal line; a total number of the at least one selection signal line and the at least one scanning signal line is less than a total number of the lead wires; the touch controller sends a selection signal to the driving selector through the at least one selection signal line; the driving selector responses to the selection signal and selects at least one lead wire from the multiple lead wires to be connected with the at least one scanning signal line through at least one switching modules; and
   wherein, the driving selector comprises multiple switching modules; each of the multiple switching modules comprises a first terminal, a second terminal, and a control terminal; the first terminals of the switching modules are directly connected and electrically connected with each other, and are connected with the touch controller only through the at least one scanning signal lines; each second terminal of the switching module is connected with one corresponding sub-electrode only through one corresponding lead wire; control terminals of the multiple switching modules are directly connected and electrically connected with each other, and each control terminal is connected to the touch controller only through the selection signal line.

2. The embedded display screen having touch detection function according to claim 1, wherein, the display screen comprises multiple selection signal lines, and each selection signal line is connected with multiple control terminals of the switching modules; the number of the switching modules connected with each selection signal line is the same or different.

3. The embedded display screen having touch detection function according to claim 2, wherein, the display screen comprises multiple scanning signal lines, and each scanning signal line is connected with multiple first terminals of the switching modules; the number of the switching modules connected with each scanning signal line is the same or different.

4. The embedded display screen having touch detection function according to claim 1, wherein, the touch controller sends the selection signal in a time interval when the display controller does not perform a display driving to the liquid crystal display layer.

5. The embedded display screen having touch detection function according to claim 1, wherein, the display screen further comprises at least two bonding packaged pins; the at least one selection signal line and the at least one scanning signal are correspondingly connected with the at least two bonding packaged pins such that the touch controller and the driving selector are connected.

6. The embedded display screen having touch detection function according to claim 1, wherein, the display screen is a self-capacitive type.

7. A terminal device, wherein the terminal device includes an embedded display screen having touch detection function, and the embedded display screen comprising:
   an upper substrate;
   a lower substrate;
   a liquid crystal display layer disposed between the an upper substrate and the lower substrate;
   a common electrode disposed between the upper substrate and the liquid crystal display layer, wherein, the common electrode is divided into multiple sub-electrodes arranged as a matrix to form a touch detection electrode;
   a display controller disposed outside a space formed by the upper substrate and the lower substrate, disposed at a first side of the space, and the display controller is connected with the common electrode through lead lines;
   a driving selector disposed between the upper substrate and the lower substrate, disposed oppositely to the display controller, and correspondingly connected with the multiple sub-electrodes one by one through multiple lead wires;
   a touch controller disposed outside the space formed by the upper substrate and the lower substrate, disposed at a second side of the space and disposed oppositely to the display controller, wherein, the touch controller is connected with the driving selector through at least one selection signal line and at least one scanning signal line; a total number of the at least one selection signal line and the at least one scanning signal line is less than a total number of the lead wires; the touch controller sends a selection signal to the driving selector through the at least one selection signal line; the driving selector responses to the selection signal and selects at least one lead wire from the multiple lead wires to be connected with the at least one scanning signal line through at least one switching modules; and
   wherein, the driving selector comprises multiple switching modules; each of the multiple switching modules comprises a first terminal, a second terminal, and a control terminal; the first terminals of the switching modules are directly connected and electrically connected with each other, and are connected with the touch controller only through the at least one scanning signal lines; each second terminal of the switching module is connected with one corresponding sub-electrode only through one corresponding lead wire; control terminals of the multiple switching modules are directly connected and electrically connected with each other, and each control terminal is connected with the touch controller only through the selection signal line.

8. The terminal device according to claim 7, wherein, the display screen comprises multiple selection signal lines, and each selection signal line is connected with multiple control terminals of the switching modules; the number of the switching modules connected with each selection signal line is the same or different.

9. The terminal device according to claim 8, wherein, the display screen comprises multiple scanning signal lines, and each scanning signal line is connected with multiple first terminals of the switching modules; the number of the switching modules connected with each scanning signal line is the same or different.

10. The terminal device according to claim 7, wherein, the touch controller sends the selection signal in a time interval when the display controller does not perform a display driving to the liquid crystal display layer.

11. The terminal device according to claim 7, wherein, the display screen further comprises at least two bonding packaged pins; the at least one selection signal line and the at least one scanning signal are correspondingly connected with the at least two bonding packaged pins such that the touch controller and the driving selector are connected.

12. The terminal device according to claim 7, wherein, the display screen is a self-capacitive type.

\* \* \* \* \*